United States Patent
Foster et al.

(10) Patent No.: US 7,258,079 B2
(45) Date of Patent: Aug. 21, 2007

(54) APPARATUS AND METHOD FOR WATERPROOFING GAME BIRDS

(76) Inventors: Ken Foster, 1532 W. Lakeshore Dr., Landrum, SC (US) 29356; Ralph Brendle, 113 Common Dr., Spartanburg, SC (US) 29302

(*) Notice: Subject to any disclaimer, the term of this patent is extended or adjusted under 35 U.S.C. 154(b) by 0 days.

(21) Appl. No.: 11/252,364

(22) Filed: Oct. 17, 2005

(65) Prior Publication Data

US 2007/0084415 A1    Apr. 19, 2007

(51) Int. Cl.
*A01K 13/00* (2006.01)
*A01K 37/00* (2006.01)
*A01K 29/00* (2006.01)
*A01K 31/00* (2006.01)

(52) U.S. Cl. ............... 119/853; 119/714; 119/665; 119/651; 119/601; 119/602; 119/427; 119/174; 452/72

(58) Field of Classification Search ............ 119/650, 119/651, 665, 666, 667, 668, 673, 600–604, 119/460, 427, 448, 536, 853; 452/72
See application file for complete search history.

(56) References Cited

U.S. PATENT DOCUMENTS

| | | | |
|---|---|---|---|
| 1,506,290 A * | 8/1924 | Cardwell | 119/656 |
| 1,817,227 A * | 8/1931 | Bird | 424/623 |
| 2,482,774 A * | 9/1949 | Hodson | 118/320 |
| 2,565,332 A | 8/1951 | Trelease | |
| 2,769,744 A * | 11/1956 | Usteri | 514/461 |
| 3,083,688 A * | 4/1963 | Tillotson | 119/853 |
| 3,546,813 A * | 12/1970 | Dusseldorf et al. | 504/100 |
| 3,889,881 A * | 6/1975 | Cunningham et al. | 239/70 |
| 4,292,309 A * | 9/1981 | Higashide et al. | 424/119 |
| 4,850,997 A | 7/1989 | DuBose | |
| 5,009,197 A | 4/1991 | Cottell | |
| 5,298,251 A * | 3/1994 | Locke et al. | 424/405 |
| 5,493,996 A | 2/1996 | Verschuere et al. | |
| 5,664,593 A | 9/1997 | McClain | |
| 5,753,242 A * | 5/1998 | Nakamura et al. | 424/401 |
| 6,058,511 A * | 5/2000 | Finch | 2/200.1 |
| 6,302,122 B1 | 10/2001 | Parker et al. | |
| 6,910,446 B2 * | 6/2005 | Johnston Jr. | 119/651 |
| 6,997,139 B2 * | 2/2006 | Rapp | 119/665 |
| 2004/0131627 A1 * | 7/2004 | Werdyger | 424/184.1 |
| 2004/0250694 A1 * | 12/2004 | Lynde | 100/8 |
| 2004/0254150 A1 * | 12/2004 | Hresko et al. | 514/114 |

FOREIGN PATENT DOCUMENTS

DE          3638105 A1 *   5/1988

* cited by examiner

*Primary Examiner*—Yeri Pham Luu
*Assistant Examiner*—Joshua Michener
(74) *Attorney, Agent, or Firm*—Dority & Manning, P.A.

(57) ABSTRACT

A method and apparatus for waterproofing game birds is provided. The game birds are sprayed with a waterproofing composition in amounts that prevent excessive water absorption by the feathers of the birds in wet weather, while still permitting the game birds to fly.

24 Claims, 7 Drawing Sheets

APPARATUS AND METHOD FOR WATERPROOFING GAME BIRDS

TECHNICAL FIELD

The present subject matter concerns an apparatus and method for waterproofing game birds to enhance a bird's ability to fly in wet weather. In particular, an apparatus is provided to spray game birds with a waterproofing composition, which produces a water resistant coating on the feathers of the bird to prevent the feathers from soaking up water during wet weather, thereby preventing the birds from absorbing excessive amounts of water weight during wet weather.

BACKGROUND

Hunting clubs and resorts have become a popular diversion for many Americans. These clubs and resorts provide a gathering spot for hunters to allow them to hunt for specific game. Game birds are a popular choice for hunting at these clubs and resorts. Due to the number of hunts that occur each year, a wild population of game birds such as quail, pheasant, chukar, partridge, grouse, ducks, etc., that would normally reside on the clubs or resorts grounds cannot support these hunts and still survive and/or thrive. For this reason, pen-raised birds are often let loose on the day of the hunt at specific locations to ensure a successful hunt for the clubs' or resorts' paying members. In practice, the hunters that are going out each day select a specific number of these pen-raised birds and pay a specified price for each bird to be placed out in the field in which they will hunt.

During wet weather, problems arise with hunts of pen-raised birds. The pen-raised birds often become waterlogged in rainy weather. On wet days, the birds may be prevented from flying due to the moisture matting their feathers down on their wings as well as the excess weight added by the absorption of the water into the feathers. Rainy day hunts may often have to be cancelled due to the fact that these birds cannot fly. It is estimated that a single hunting club or hunting resort may lose over $100,000 a year because of missed hunts due to rainy and damp weather.

SUMMARY

According to certain aspects of the present subject matter, an apparatus for waterproofing game birds is provided. The apparatus includes a spray system having at least one spray module. The spray system is capable of spraying a waterproofing composition under pressure from the at least one spray module. A holding device is configured to retain the game birds. The holding device is also configured to receive therethrough the waterproofing composition to allow the game birds inside to be coated with the waterproofing composition. A control unit is configured to control the spraying time and pressure generated by said spray system. The control unit controls the spray system such that the waterproofing composition exiting the spray system coats the game birds with sufficient amounts and sufficient coverage of the waterproofing composition to prevent feathers of the game birds from absorbing excessive amounts of water in wet weather. At the same time, the amount and coverage of the waterproofing composition on each game bird still permits the game bird to fly.

According to other aspects of the present subject matter, a method of waterproofing game birds is provided. The method includes the step of spraying the game birds with an oil and wax mixture in amounts that prevent excessive water absorption by the feathers of the birds in wet weather. At the same time, the amount of oil and wax mixture sprayed on the game birds still permit the game birds to fly. The birds are then allowed to dry after spraying.

According to other certain aspects of the invention, a method for waterproofing game birds is provided. The method includes providing an apparatus having a sprayer system and a holding device. The spray system has at least one container for housing a waterproofing composition and at least one spray nozzle secured to the at least one container to disperse the waterproofing composition. The waterproofing composition in the at least one container is heated to a desired temperature range. The game birds are loading into a holding device during the process and the holding device is placed within the apparatus. The birds are sprayed once the holding device containing the birds is placed in the apparatus and the waterproofing composition is in the desired temperature range. The birds are coated with the waterproofing composition in amounts that prevent excessive water absorption in wet weather, while still permitting the game birds to fly. Further, the temperature and amount of waterproofing composition sprayed on the birds do not harm the feathers of the birds. The holding device can be then removed from the apparatus and the birds can be unloaded from the holding device. The birds can then be placed in the field for the hunt after the waterproofing is finished allowing time to dry if needed.

According to further certain aspects of the present subject matter, an exchangeable spray module for use within an apparatus for waterproofing game birds is provided. The spray module includes a container for holding a waterproofing composition. A valve is disposed on the container that permits the container to be filled with the waterproofing composition. At least one spray nozzle is attached to the container. The at least one spray nozzle provides an outlet from the container for dispersing of the waterproofing composition. A heater unit is positioned proximal to the container. The heater unit can heat the container to a temperature range that liquefies the waterproofing composition. At the same time, the temperature of the waterproofing composition as it contacts the birds is such that the birds or their feathers are not harmed upon application of the waterproofing composition on the birds.

BRIEF DESCRIPTION OF THE DRAWINGS

A full and enabling disclosure of the present subject matter including the best mode thereof to one of ordinary skill in the art is set forth more particularly in the remainder of the specification, including references to the accompanying figures in which.

DETAILED DESCRIPTION

Reference will now be made in detail to presently preferred embodiments of the invention, one or more examples which are shown in the Figures. Each example is provided to explain the invention and not as a limitation of the invention. In fact, features illustrated or described as part of one embodiment can be used with another embodiment to yield still a further embodiment. It is intended that the present invention cover such modifications and variations.

As used herein, "waterproof" and "waterproofing" mean to make the feathers of the game birds more water resistant by preventing feathers of the game birds from absorbing excessive amounts of water in wet weather and generally preventing the feathers from becoming matted due to moisture during wet weather, while still permitting the game birds to fly in such weather. A "waterproofing composition" means a composition that can be applied to the feathers of game birds to make the feathers of the game birds more water resistant by preventing feathers of the game birds from absorbing excessive amounts of water in wet weather and generally preventing the feathers from becoming matted due to moisture during wet weather, while still permitting the game birds to fly in such weather. The amount of the waterproofing composition and manner in which it is applied to the game birds will affect whether the game birds can fly.

Figure 1:
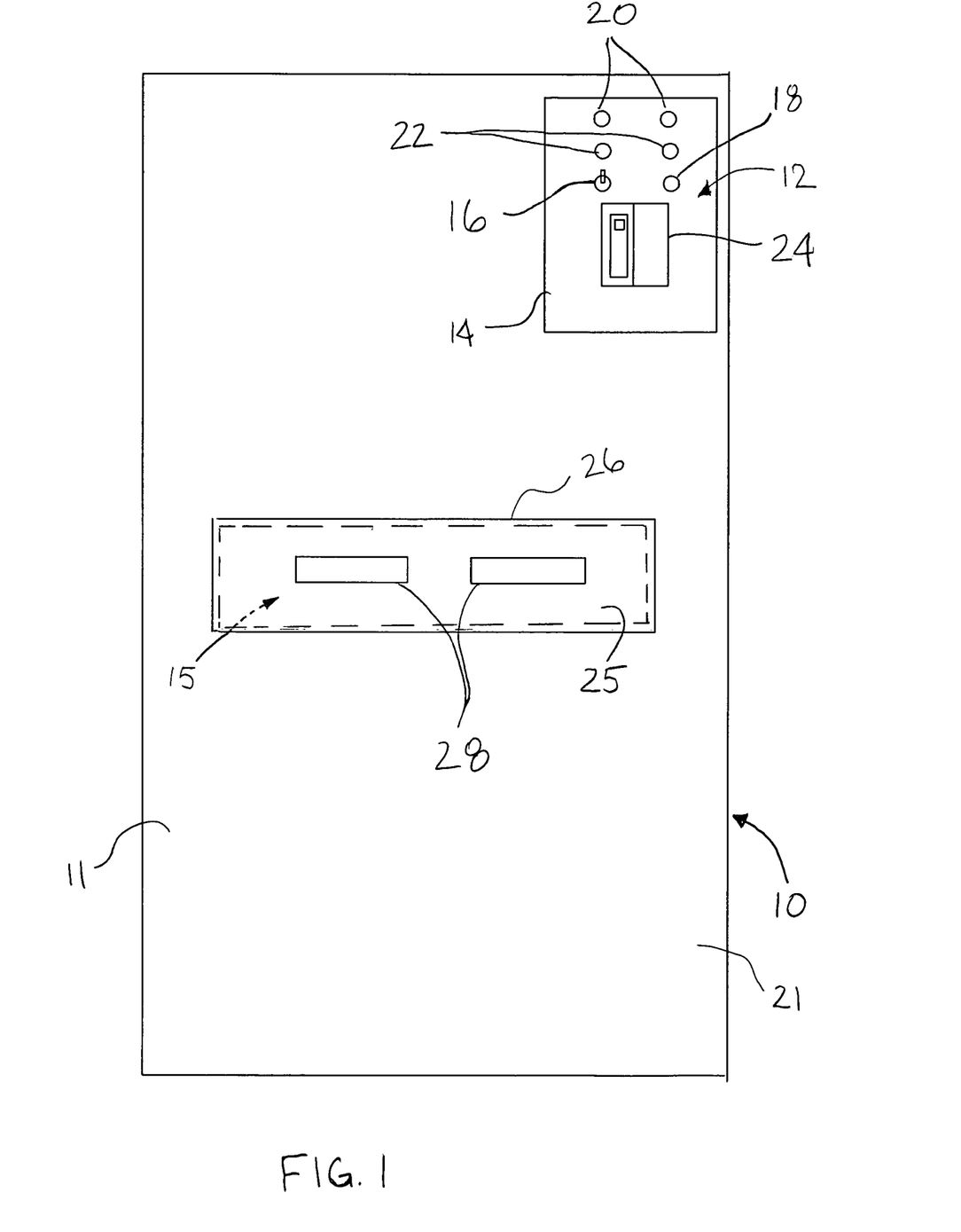
FIG. 1 illustrates a schematic front view of an embodiment of an apparatus used to treat birds according to the present subject matter.

FIG. 1 shows an apparatus, generally 10, for spraying a waterproofing composition on birds to generally waterproof the birds to help enhance their flight capability in wet weather. A front side 11 of the apparatus 10 is shown. The apparatus 10 may have a housing 21 to facilitate containment of the process. A control unit 12 of which a control panel 14 may be apart controls the spraying of birds with a waterproofing composition that helps to enhance their flight capability in wet weather. The control panel 14 of the control unit 12 has a power switch 16 that turns on the apparatus. The control panel also had a spray button 18 located beside the power switch 16. The spray button 18 can be pushed to activate spraying of the birds. The control panel 14 may include a breaker, or fuse, 24 to ensure that a power surge does not destroy the control unit 12.

Heater unit indicator lights 20 for indicating power to heater units for heating the waterproofing composition and spray indicator lights 22 used to notify the operator that the birds are being sprayed are also on the control panel 14. The heat indicator lights 20 inform the operator when he can properly spray the birds. The heat indicator lights 20 and the spray indicator lights 22 may also be used to inform the operator that the unit is functioning properly and to aid in diagnosis when there is a malfunction. Other indicator means like a digital display, sound emitting device, or the like can be used in place of the indicator lights.

A holding device 26 in the front side 11 of the apparatus 10 holds the birds during the treatment process. The holding device 26 retains the birds therein during the spraying of the birds. In the shown embodiment, the holding device 26 is a drawer. However, other holding devices such as cages, holding pens, or the like may be used in the apparatus. The drawer 26 has a front side 25 on which two handles 28 are placed. A single handle may also be used in order to pull the drawer 26 in and out of the apparatus 10. The drawer 26 is slid into an opening 15 (shown in phantom) in the front side 11 of the apparatus 10 after birds, which are to be sprayed by the apparatus, have been placed inside the drawer 26.

Figure 2:
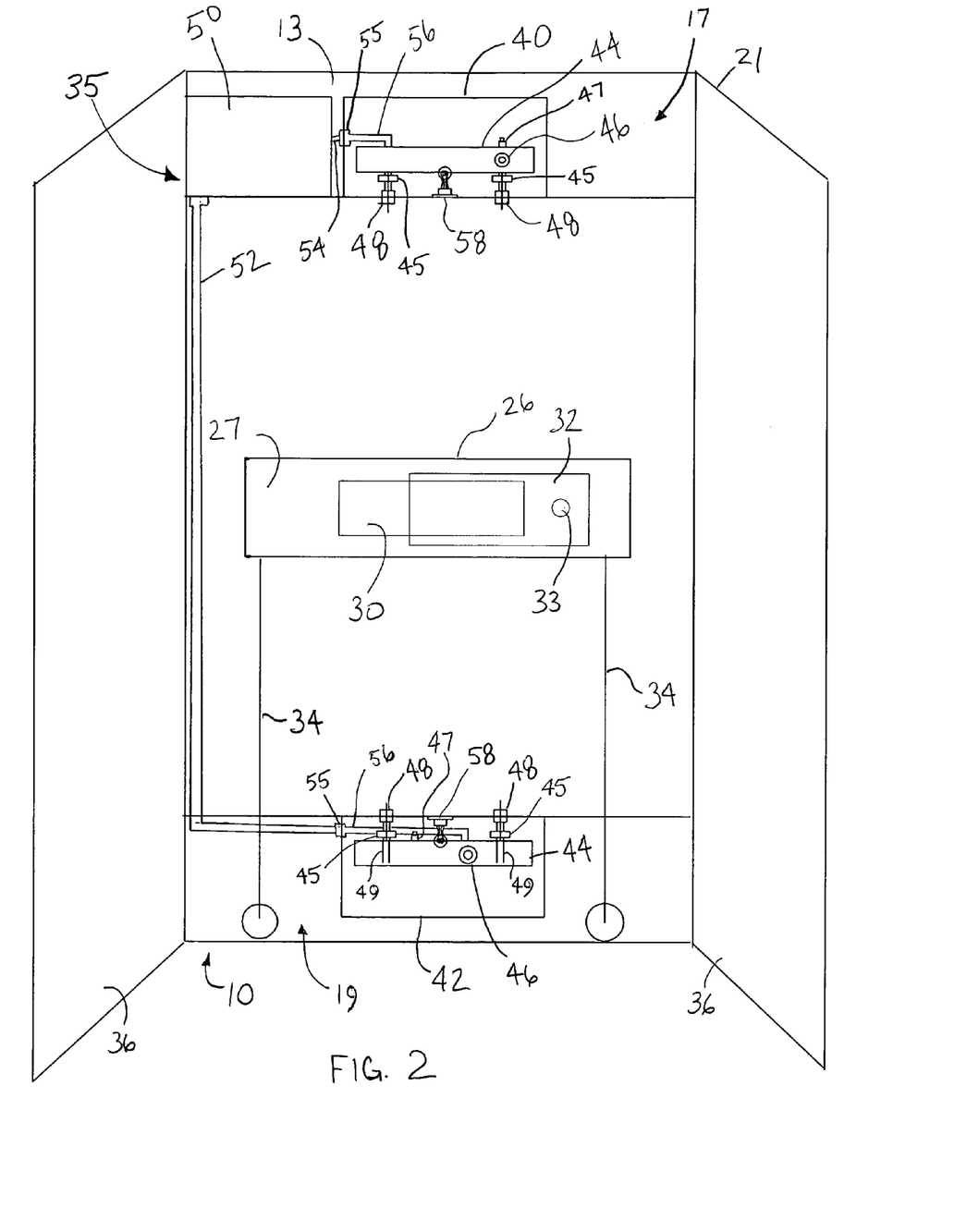
FIG. 2 illustrates a schematic back view of the embodiment of the apparatus depicted in FIG. 1.

FIG. 2 illustrates a schematic view of the back side 13 of the apparatus 10. The back side includes doors 36, which may be closed and locked to limit access to the rear of the apparatus 10. The doors 36 are open to allow access to the components of the spray system 35. The spray system 35 includes an air compressor 50 secured to a first spray module 40 by air line 54 in a top portion 17 of the apparatus 10 and also connected to a second spray module 42 connected by air line 52 in a bottom portion 19 of the apparatus 10. The spray modules 40, 42 each include a container 44 in which the waterproofing composition is stored. A heater unit 58 is secured in each spray module 40, 42 for heating the waterproofing composition in the container. Air provided by the air compressor 50 through air line 52, 54 is supplied to an internal air line 56 in each spray module 40, 42. The internal air lines 56 are connected to the container 44 to provide compressed air thereto. The compressed air pressurizes the container 44 to allow the spray nozzles to spray the waterproofing composition at a correct distribution level.

Referring to FIGS. 1 and 2, when the power is turned on by switch 16 on the control panel 14, heater units 58 are engaged and begin to heat the interior of the spray module 40, 42 and, in particular, the container 44. A thermostat 46 that is disposed within each spray module 40, 42 controls the level of the temperature within the container 44. Once the temperature within the container 44 reaches a level that allows for a desired viscosity of the waterproofing composition, the thermostat 46 regulates the temperature within a specific range by turning on and off the heater units 58 while the apparatus 10 is on.

The spray modules 40, 42 may be integral and stationary within the spray system 35. In other embodiments, the spray modules 40, 42 may be modular and exchangeable, meaning that the spray modules 40, 42 may be removable from and insertable into the spray system 35. Thus, each of the spray modules 40, 42 can be removed as a unit from the respective top portion 17 and a bottom portion 19 of the apparatus 10. In this manner, after a set number of sprays, the waterproofing composition within the container 44 will be depleted and the spray modules can be exchanged out for spray modules 40, 42 having containers 44 full of the waterproofing compositions to spray on the birds. The internal air lines 56 can be disconnected at connection points 55 from the air lines 52, 54, respectively, and the spray modules 40, 42 can be detached from the top and bottom portions 17, 19 of the apparatus 10. Once the empty spray modules 40, 42 are removed, spray modules with filled containers 44 may be inserted so that lines 52 and 54 are reconnected to the internal air lines 56 within the new spray modules 40, 42. The empty spray modules 40, 42 may then have the containers 44 filled through valve 47 with more waterproofing composition so that they may be used again within the apparatus 10.

Each spray module 40, 42 may include a container 44 and two nozzles 48. However, the number of nozzles may vary depending on the apparatus 10. The nozzles 48 have solenoids 45 disposed thereon to open and close the nozzles 48. Each spray module 40, 42 may also include an internal air line 56 and a heater unit 58. However, the air compressor 50 may be plugged directly into the container 44 in some embodiments. Further, the heater units 58 may be secured to the respective top and bottom portions 17, 19 of the apparatus 10. When the spray modules 40, 42 are removed from the apparatus 10, they are disconnected from the control unit 12. When the spray modules 40, 42 are installed, they are then connected to the control unit 12 to allow the carrying out of necessary functions of the apparatus 10.

When the drawer 26 is inserted into the front side 11 of the apparatus 10 as shown in FIG. 1, the drawer 26 rests upon supports 34. The drawer 26, having a frame 23, has a back side 27 which forms an opening 30 through which the birds may be inserted into the drawer 26. The birds may then be sprayed from both the top and the bottom by the spray modules 40, 42. The opening 30 has a door 32 which may be opened so that the birds may be corralled into the drawer 26 before the spraying of the birds. The door 32 which has a handle mechanism 33 may then be closed once a sufficient number of birds are within the drawer 26. When loading the drawer 26, the drawer would normally be pulled out of the apparatus, and the birds would be corralled into the opening in the back side 27 of the drawer 26. Once a desired number of birds are in the drawer 26, the door 32 is shut to close the opening 30 and the drawer 26 is placed back in the opening 15 of the apparatus 10.

Figure 3:
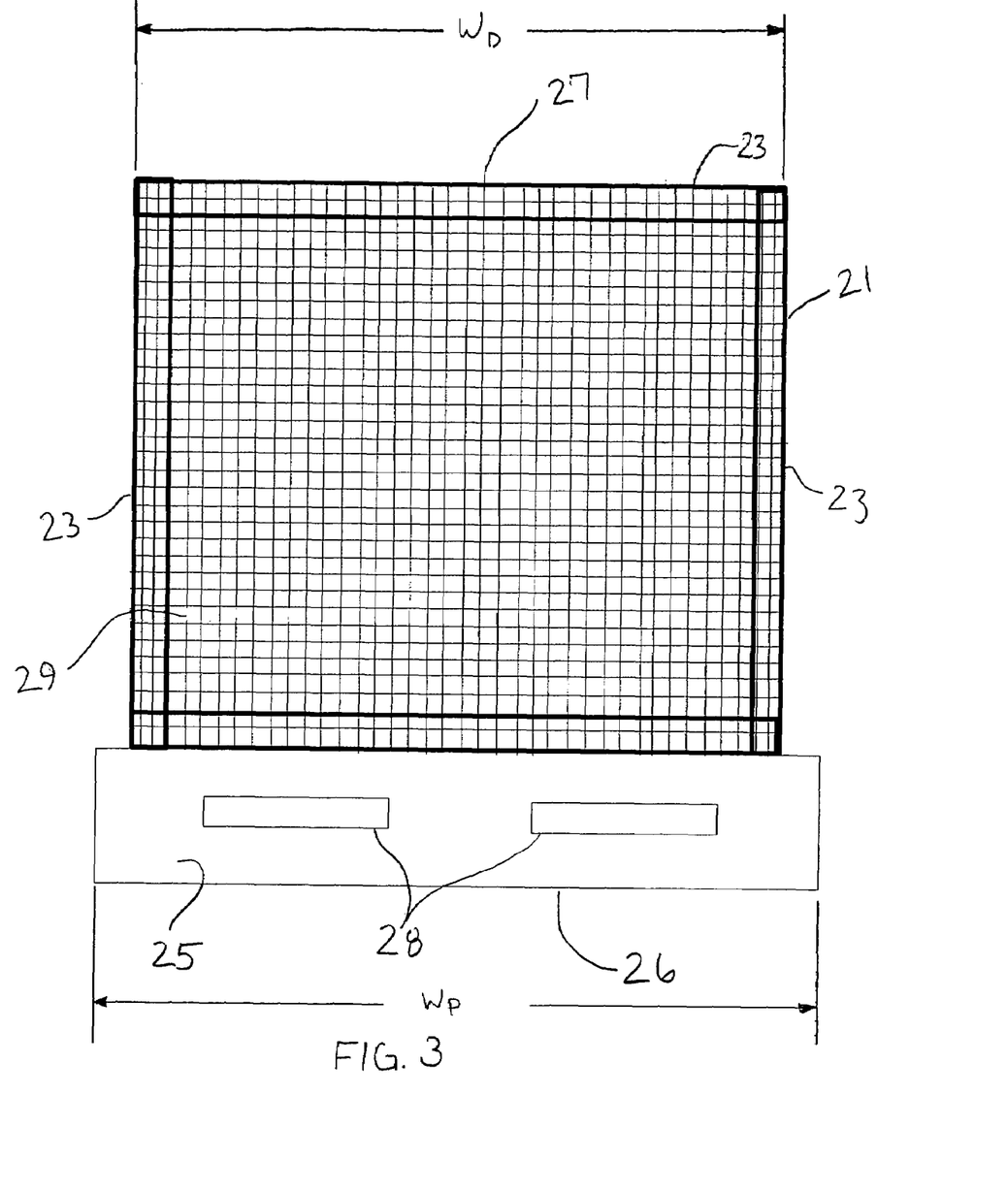
FIG. 3 illustrates a schematic top view of a drawer used in the apparatus depicted in FIG. 1.

FIG. 3 shows a schematic view of the drawer 26. The drawer 26 includes a front side panel 25 that has a larger width $w_p$ than the body 21 of the drawer 26 which has a width of $w_d$. The size of the drawer 26 depends on the size of the apparatus 10 as well as the number of birds which the operator expects to spray during operation. The drawer 26 has the frame 23, which form sides of the drawer and defines a drawer space therebetween. The top of the drawer 26 is covered with a mesh 29. The mesh 29 can be a wire mesh made of metal. Further, the mesh 29 may be a satisfactory plastic or textile mesh that will support the weight of the birds contained therein. The spacing of the mesh 29 should be small enough so that the birds to be sprayed, whether quail, chukar, pheasant, partridge, duck, or the like, are sufficiently supported from underneath. At the same time, the spacing of the mesh 29 should be large enough to allow quick coverage of the birds from the spray being sprayed from both the top and the bottom to permit a protective coating to cover the birds. The birds can be loaded into the drawer either before or after heating of the spray modules 40, 42.

The front panel 25 with the width $w_p$ is wider than the body 21 with the width $w_d$ so that when the drawer 26 is closed against housing 21, the apparatus 10 is adequately sealed to prevent the spray from escaping. However, such a feature is not necessary during practice of the present subject matter. For example, the apparatus 10 may include a frame with no housing 21 to contain the process. In such an embodiment, the drawer may be a simple holding pen or cage.

In the embodiment shown in FIG. 3, the drawer is large enough to hold, for example, 50 quail. Large drawers may be used to accommodate more quail or birds of a larger size, such as chukars or pheasant, for example. For example, a drawer for holding up to as many as 200 may be used if the apparatus accommodates such a sized drawer. Also, the height $H_D$ of the drawers (FIG. 5) may also vary depending on the type of birds being treated.

Figure 4:
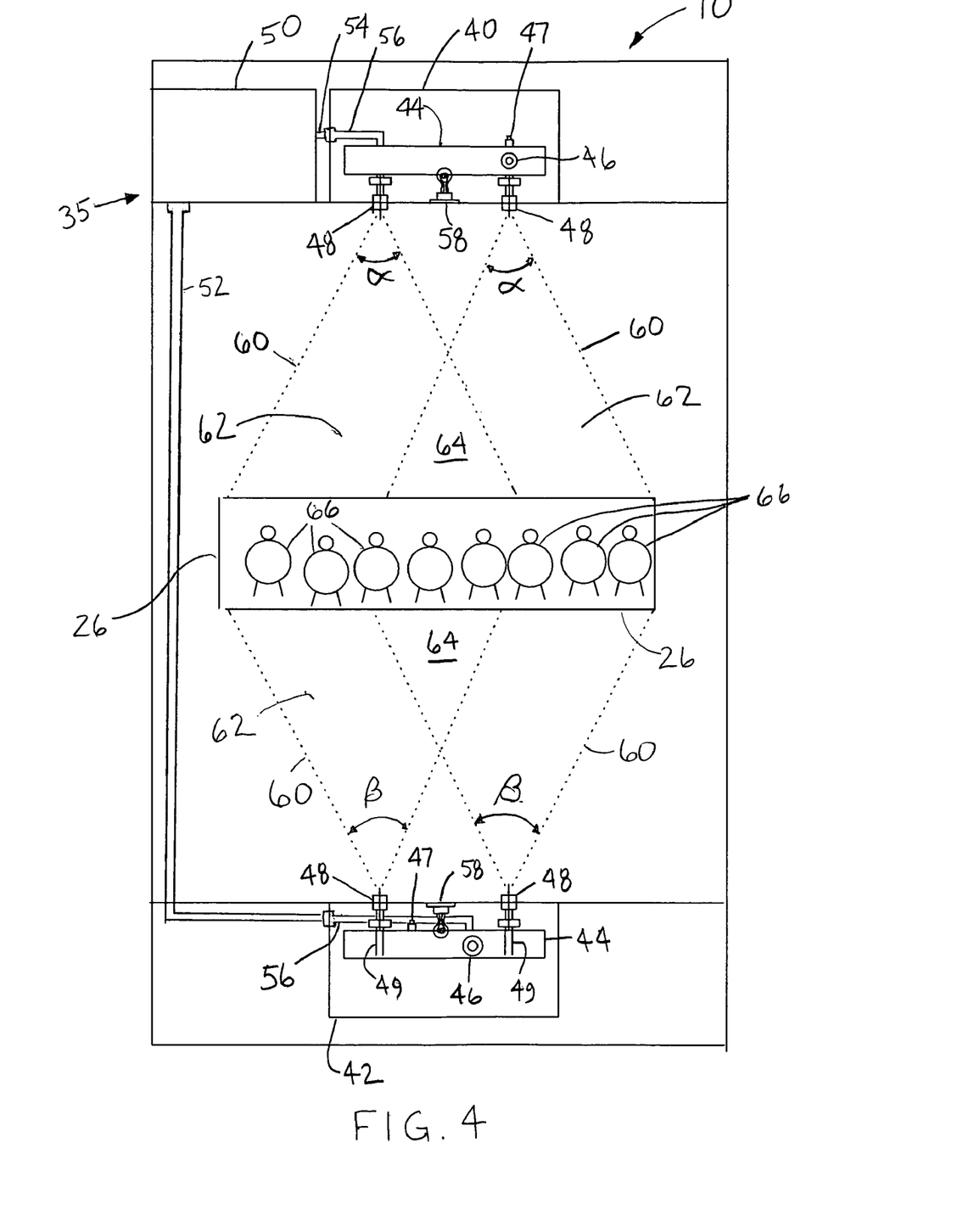
FIG. 4 illustrates a schematic front interior view of the apparatus shown in FIG. 1 when the apparatus is in use.
Figure 5:
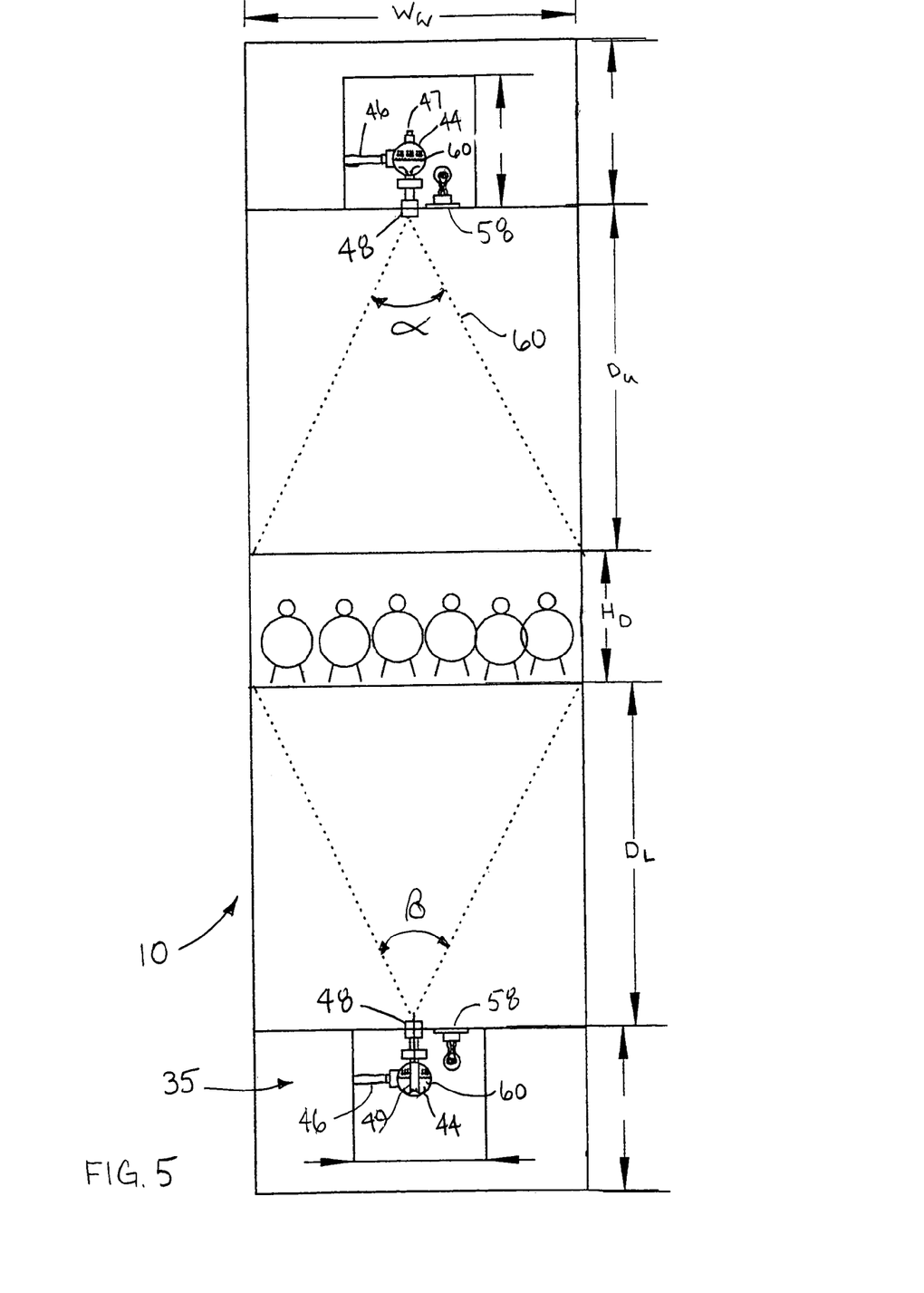
FIG. 5 illustrates a schematic side interior view of the apparatus shown in FIG. 4 when the apparatus is in use.

FIGS. 4 and 5 show a schematic view of the apparatus 10 during operation. Referring to FIGS. 1, 4 and 5, the operator activates the power switch 16. The heater units 58 and the air compressor 51 are energized. The air compressor 51 brings the pressure up within the container 44. Once the heater units 58 are activated to heat the waterproofing composition 60, the indicator lights 20 come on to inform the user that the heater units 58 are on and operating. Each indicator light 20 is associated with one of the heater units 58. If one of the heater units is malfunctioning, then the associated indicator light 20 will not turn on. Once the heater units 58 have heated the waterproofing composition 60 shown in FIG. 4 and 5 to a sufficient level, the waterproofing composition should have a desired viscosity for spraying of the birds 66. The thermostat 46 of the control unit 12 signals the indicator lights 20 to turn off. The operator may now spray the birds 66 contained within the drawer 26. As shown in FIG. 1, the operator pushes the spray button 18 on the control panel 14 to engage solenoids 45 that open to allow waterproofing composition 60 to spray out of the spray nozzles 48.

Since the air from the air compressor 50 passes through the air lines 52, 54 into the internal air lines 56 to pressurize the container 44, the pressure differential between the exterior of the nozzle and the interior of the container causes the waterproofing composition 60 to spray in an atomized mist 62 so that the birds 66 are lightly sprinkled with the waterproofing composition 60 from both a top position and a bottom position to allow the birds to be adequately covered to prevent them from becoming waterlogged when the birds are placed in a wet atmosphere. Each spray nozzle 48 sprays the waterproofing composition 60 at a specific spray geometry so that adequate coverage of the birds 66 is obtained.

For example, in FIGS. 4 and 5, the top spray nozzles 48 spray the mist in a spray geometry of a generally concentric three-dimensional cone having an angle $\alpha$. In the embodiment shown, the spray overlaps in section 64 to ensure adequate coverage within the drawer space within drawer frame 23. In this manner, birds in the outer edges of the middle portion of the drawer are generally better covered. At the same time, the birds beneath the overlap section 64 may receive more mist than other birds. However, the added weight from the double misting of the birds under the section 64 is not enough to prevent the birds from obtaining flight when placed in a wild environment.

Similarly, the spray nozzles 48 in the bottom section may spray in a spray geometry of a concentric three-dimensional cone having an angle $\beta$, which may be the same as the angle $\alpha$, or may be a different angle. Similarly, the atomized mist 62 of the bottom sprayer may also overlap in a section 64 to increase adequate coverage of all the birds in the drawer from below. Again, the extra weight added to the birds 66 from double exposure above the overlap section 64 should not affect the flying capability of the birds.

The spray geometry of the nozzles 48 may also be changed to provide different coverage for different embodiments of the apparatus 10. The spray geometry can take on any of a number of shapes. For example, the spray geometry of the nozzles 48 may be a three-dimensional elliptical cone, or a more rectangular cone shape. The shape of the spray geometry may vary depending on the number of nozzles 48 and the size and shape of the drawer 26.

The distance between the spray nozzles 48 and the drawers 26, the air pressure at which the spray nozzles 48 spray, the spray geometry of the nozzles 48 and the direction of the spray are all interdependent. Each should be chosen so as to ensure that the birds are adequately covered with the waterproofing composition to sufficiently prevent the birds from becoming waterlogged in rainy weather while at the same time not hampering their flight abilities by adding to much excess weight to the birds. Therefore, the number of spray units within the machine, the width $w_w$ of the apparatus, the spray geometry of the nozzle, and the distance between the spray nozzle and the drawer 26 should be taken into consideration when deciding on the spray nozzle 48. Also, the spray nozzles 48 on the bottom container 44 may have a different spray capacity than the spray nozzles 48 on the top container 44, which may use gravity to aid in covering the birds from a top position. Spray nozzle 48 on the bottom spray module 40 can be set to spray under a slightly greater pressure to counter the effects of gravity.

Depending on the size of the apparatus 10, the types of birds and the number of birds to be treated, the number of spray modules 40, 42 contained in the apparatus 10 and each spray module's configuration may vary. For example, in the embodiment shown, 50 quail may be processed at a time. Such a number allows for a sufficient number of birds for most hunt clubs or resorts to be processed in a relatively short time period. However, for large clubs or resorts, an apparatus that contains three drawers that can hold 50 quail each may be desirable. Such an apparatus would require three upper and three lower spray modules used in conjunction with the three drawers with each spray module utilizing two spray nozzles. Smaller operations may require only one upper and one lower spray module containing only one spray nozzle each within its apparatus. Further, larger drawers may be used requiring larger spray modules with more spray nozzles. Also, in some embodiments, the birds may only be sprayed from above to cover the top portion of the birds. Thereby, the apparatus, if desired, can be customized to the needs of the individual customers. The types of nozzles used, the pressure at which the spray system 35 operates, and the desired time duration of the spraying can also change the configuration of the apparatus and the spray modules.

The air compressor 50 may be regulated to maintain the pressure between about 15 and about 100 pounds per square inch ("p.s.i.") depending on the construction of the apparatus. In the embodiment shown, the air compressor 50 has an internal regulator, which maintains the pressure in the system between about 35 and about 57 p.s.i. The pressure at which the air compressor maintains the system depends on the distance from the birds at which the spray nozzles are located, the types of spray nozzles used, the duration of the spraying, and the type of waterproofing composition used.

The heater units 58 may be heat lamps, infrared heaters, radio frequency heaters, microwave heaters, electric heating elements, or the like. In the embodiment shown, the heater unit includes a light socket and a 150 watt light bulb within the spray modules 40, 42. The light bulbs are cost effective, simple to replace, limited in the amount of heat generated making them easy to control and safe to operate. In other embodiments, the heater unit 58 will depend on the range of heat needed to heat the waterproofing composition to a viscosity that facilitates its use in a spray. In any event, the temperature of the waterproofing composition at the point in time that it coats the feathers of the birds should not be at a level where it harms the feathers or the birds.

Figure 6:
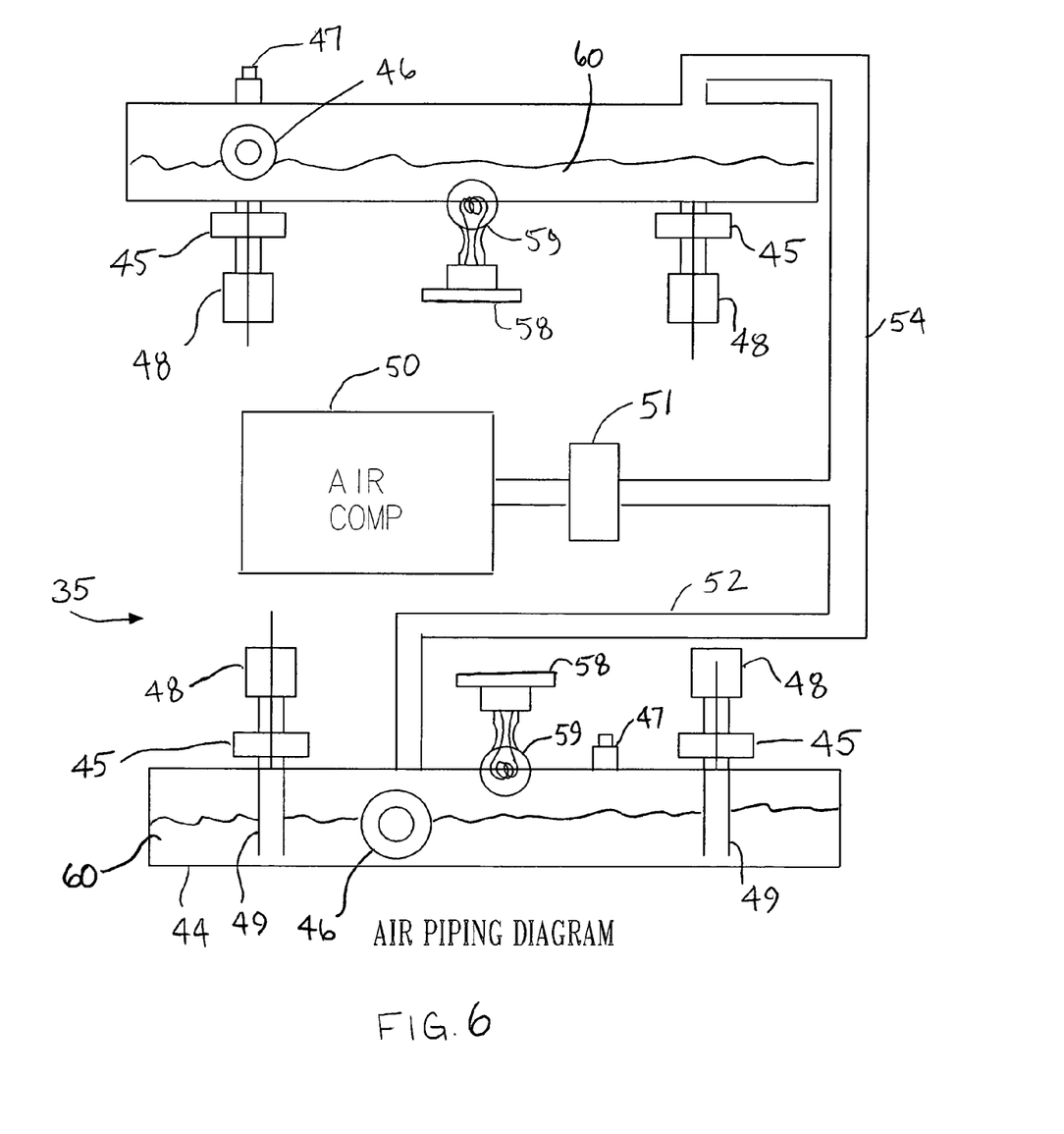
FIG. 6 illustrates a schematic view of a spraying system used in the apparatus shown in FIG. 1.
Figure 7:
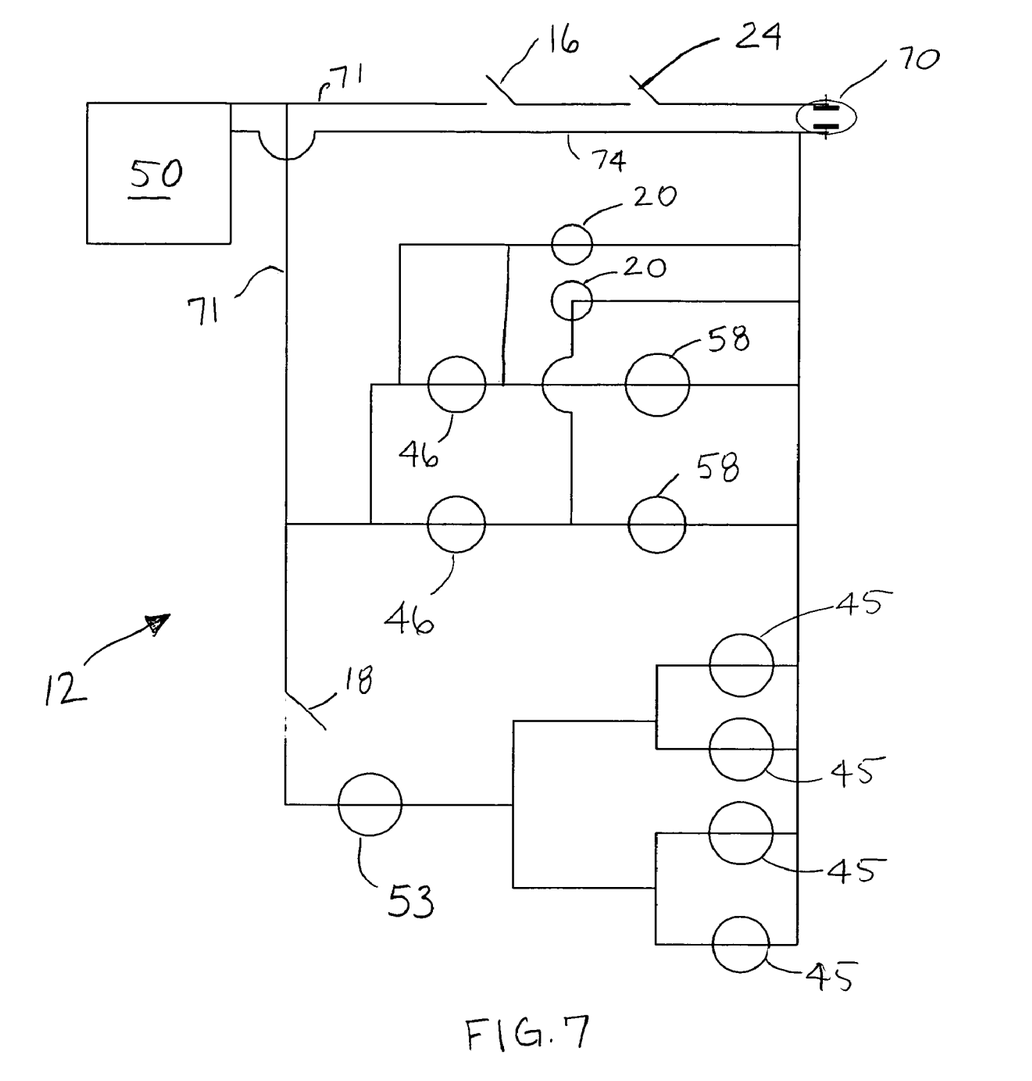
FIG. 7 illustrates a schematic diagram of the control unit used in the apparatus shown in FIG. 1.

FIG. 6 shows a schematic of an embodiment of the spray system 35 used within the apparatus 10. The air compressor 50 provides pressurized air through air lines 52, 54 to the upper container 44 and the lower container 44. A regulator 51 controls the amount of air and the level of pressure. The heater units employ lamps, such as light bulbs 59 to heat the respective container and the contents inside. The thermostat 46 is used to measure the temperature of the waterproofing composition 60. The thermostat keeps the waterproofing composition 60 within the temperature range by turning the heater unit 58 on and off in a similar manner as a thermostat on a heating and cooling unit of a house. A pair of nozzles 48 is attached to both the upper and lower containers 44. The nozzles are spaced apart enough to permit adequate coverage of the birds contained within the drawer 26 based on the spray geometry of the nozzles 48. Each nozzle 48 has a solenoid 45 secured thereto. The solenoids 45 open and close the passageway between the respective nozzles 48 and the containers 44 to which they are attached. Valves 47 permit refill of the containers 44, once the waterproofing composition is used up.

In the embodiment shown, the waterproofing composition 60 is heated to a desired temperature. The waterproofing composition 60 liquefies to obtain a desired viscosity at such temperatures. The thermostat 46 measures the temperature of the mixture 60. The thermostat 46 keeps the mixture 60 within the temperature range by turning the heater unit 58 on and off. When the temperature reaches a temperature within the desired temperature range, the thermostat 46 which is part of the control unit 12, turns off the heater units and the heater indicator lights 20 (see FIG. 1) are turned off.

When the spray button 18 is pushed, solenoids 45 secured to each nozzle 48 are opened. The pressure differential between the pressure of the surrounding atmosphere and the pressure within the containers 44 causes the waterproofing composition to spray through the nozzles 48. The nozzles 48 atomize the waterproofing composition 60 into a mist that sprays out of the nozzles 48 in the desired spray geometry as shown in FIGS. 4 and 5. In the embodiment shown, the nozzles at pressures between about 35 and about 57 p.s.i. will have a flow rate of approximately about 0.5 gallons/minute.

In the embodiment shown, which is used for quail, the solenoids are opened for a short period of time. For example, the solenoids 45 are opened for less than a second, such as around 0.45 seconds. With the spray nozzles used at the indicated pressures, this translates to about 0.04 ounces per bird. However, a range of about 0.02 ounces to 0.10 ounces for quail can also be acceptable. For large birds, such as chukar and pheasant, the amount of waterproofing composition sprayed from the spray nozzles will increase. Depending on the size of the larger birds, a range of about 0.05 ounces up to several ounces may be called for. The amount should be enough to prevent absorption of excessive amounts of water during wet weather, while not impeding the birds ability to fly or hampering the scent of the birds. As stated above, the time duration of the spray may vary depending on the type of waterproofing composition 60 used, the temperature to which it is heated and the type of spray nozzle used as well as the type of birds to be sprayed.

For the lower container 44, the nozzle 48 has piping 49 which extends deep into the container 44 to maximize the use of the waterproofing composition 60 contained therein. Since the lower nozzles 48 are spraying upwards and are connected on a top portion of the container 44, the nozzle 48 extends down into the lower portion of the container 44 to pull the waterproofing composition therefrom. Thus, when the amount of waterproofing composition is lower, the lower nozzles 48 still spray a desired and evenly spread amount of waterproofing composition onto the birds. As can be seen in FIG. 6, the upper container 44 does not need such piping, since the upper nozzles 48 are attached to the bottom of the lower container 44. Since the upper nozzles 48 are automatically pulling waterproofing composition from the bottom of the container 44, a desired and evenly spread amount of waterproofing composition 60 is sprayed onto the birds from above, even as the waterproofing composition is depleted.

The waterproofing composition used to treat the birds may be any substance that has waterproofing properties, is not toxic to the birds and coats the birds without injury or impairment of flight. The waterproofing composition should adhere to the birds, especially in wet weather while again not impairing flight. Also, the waterproofing composition should not alter the smell or taste of the birds to a degree that it adversely effects the pointing and retrieval of the birds by hunting dogs. Thus, the waterproofing composition should not produce a noticeable odor. Further, the waterproofing composition should be non-toxic when consumed by humans.

The waterproofing composition may be a chemical or chemical mixture. An oil and wax mixture may be used as the waterproofing composition. For example, a paraffin oil and a paraffin wax mixture may be employed. The percent of each within the mixture may vary depending on the drying time desired to allow the coating to dry on the birds before they are released. For instance, the mixture may be 90% paraffin oil/10% paraffin wax or 10% paraffin oil/90% paraffin wax or any percentage mixture between these two examples. One embodiment of the waterproofing composition is a 60% food grade paraffin oil/40% food grade paraffin wax. For example, the paraffin oil may be manufactured by Lamplight Farms in Menomonee Falls, Wis. and the paraffin wax may be Gulf Wax distributed by Royal Oak Sales, Inc., in Roswell, Ga. The paraffin oil/paraffin wax mixture can be easily processed at relatively low temperatures. The viscosity of the paraffin oil/paraffin wax mixture at temperatures between about 120 degrees and 175 degrees Fahrenheit, for example, between about 120 and 140 degrees Fahrenheit, permits the spray nozzles 48 to create a generally uniform atomized mist of the paraffin oil/paraffin wax mixture. This provides a generally even coating to the birds at a temperature that does not injure the birds or their feathers to any degree that would impair flight when using the apparatus 10.

Such a mixture can be applied by hand, but the process is very cumbersome with a great opportunity to over coat the birds, thereby hampering their ability to fly. The use of the apparatus 10 allows for generally precise and even coatings of the birds in amounts that permit the birds to fly.

Depending on the waterproofing composition used the waterproofing composition may not need to be heated. Further, some waterproofing compositions may need to be heated around 175 degrees Fahrenheit. However, the temperature of the waterproofing composition once it touches the feathers of the birds should be less than these higher temperatures. This lowering of the temperature may be accomplished by increasing the distance between the spray nozzles and the drawer in which the birds are placed.

FIG. 7 shows a schematic diagram of the basic components of the embodiment of control unit 12 of the apparatus 10. The control unit 12 is connected to a power source 70. A breaker, or fuse, 24 may be installed to prevent a power surge from damaging the control unit 12. The apparatus is turned on by activating the power switch 16. When the power switch 16 is activated, the air compressor 51 starts the process of pressurizing the containers 44. Power is sent to the upper and lower thermostats 46 and the heater units 58. The heater unit indicator lights 20 are lit to indicate the heat units 58 are engaged. The thermostats 46, which are secured to the containers 44, measure the temperature. Once it is determined that the temperature is within a desired range, indicator lights 20 are turned off to indicate the system is ready.

At this point, the operator of the apparatus 10 can activate the sprayers by initiating the spray button 18. The spray button 18 activates a timer 53, which permits the upper and lower solenoids 45 to be opened for a selected time period.

The time period at which the timer 53 opens the solenoids 45 is interdependent on the type of waterproofing composition, the pressure within the containers, the types of nozzles used and the type of birds being treated. For example, if quail are being treated with waterproofing composition of about 40% paraffin wax and about 60% paraffin oil and a nozzle such as the nozzle item No. BCW1200T1SN supplied by PNR America, LLC of Poughkeepsie, N.Y., is used with a pressure within the containers of about 57 p.s.i., then the timer will open the solenoids for a time period of about 0.045 seconds. This permits enough of the waterproofing composition to coat the quail to prevent excess water absorption of the birds' feathers during damp or rainy weather, while not hampering the flight of the birds. For example, the weight of the coating may be around 0.04 ounces. The amount of waterproofing composition coating sprayed on the birds can vary. However, the amount should not exceed the weight at which the birds ability to fly is hampered.

Other types of control units may be used to control the apparatus 10. For example, programmer logic controllers, personal computers, mini-computers, or the like can be used to control the heating of the waterproofing composition and the timing of the spraying. Further, in such embodiments, temperature sensors instead of thermostats may be used to take the temperature reading and relay it back to the control unit, which will then control the heater unit in a manner to keep the temperature within the spray module within a specified range. Such control devices may have an internal timer or clock that it uses to measure the duration of the spraying. Alternatively, different types of timers may also be used such as digital timers, spring-loaded timers, or the like.

The following describes an exemplary method of carrying out the process of treating the birds. The power is turned on at the power switch 16. The heater units 58 within the spray modules 40, 42, the air compressor 51 and the timer 53 are energized. The air compressor 51 pressurizes the container 44 within each spray module 40, 42 to between about 35 p.s.i. and about 57 p.s.i. The birds may be loaded in the drawers, while the heater units 58 heat up the containers 44 of the waterproofing composition 60. The birds may also be loaded before the turning on of the apparatus 10 or after the heater unit indicator lights 20 turn off to indicate that the spray modules are ready to spray the waterproofing composition. Once the heater units 58 are powered, the indicator lights are turned on to indicate the heater units are working and the waterproofing composition is being heated to its spray temperature range. Once the indicator lights 20 go off, the spray modules are within the specified temperature range. The mixture should then be liquefied and pressurized and ready to spray.

The operator then presses the spray button 18 to activate the spray module. The timer 53 is actuated. The timer 53 actuates the solenoids 45 that open to allow the pressurized waterproofing composition to flow through the spray nozzles 48. The timer 53 also actuates the spray indicator lights 22 to indicate that the spraying of the birds is occurring. The timer counts down the allotted time during which the solenoids 45 are held open. Once that time has expired, the solenoids 45 are shut and the indicator lights 22 are turned off. The timer is then reset and is ready for another cycle.

The birds within the drawer are ready to be removed from the apparatus 10 to allow them to dry. A fan or other drying device may be used. However, for the embodiment shown, the birds may dry naturally within about one to two hours from when the waterproofing composition of 60% food grade paraffin oil/40% food grade paraffin wax is applied. Once dry, the birds are taken to the field to be released and hunted.

The embodiments of this invention shown in the drawings and described above are exemplary of numerous embodiments that may be made within the scope of the appended claims. It is contemplated that numerous other configurations of the apparatus for waterproofing game birds may be used and the materials may be selected from numerous materials and dimensions other than those specifically disclosed. In short, it is the Applicant's intention that the scope of the patent issuing herefrom will be limited only by the scope of the appended claims.

What is claimed is:

1. A method for waterproofing live game birds, the method comprising:
   providing an apparatus having a spray system and a holding device, said spray system having at least one container for housing a waterproofing composition and at least one spray nozzle secured to the at least one container to disperse the waterproofing composition from a position above the holding device and at least one second spray nozzle positioned to disperse the waterproofing composition from a position below the holding device;
   heating the waterproofing composition in the at least one container to a desired temperature range;
   loading the game birds into the holding device;
   placing the holding device in the apparatus; and
   spraying the birds with the waterproofing composition in a manner that the birds are coated with sufficient waterproofing composition to waterproof them while still permitting the game birds to fly.

2. A method as in claim 1, further comprising removing the holding device from the apparatus and unloading the birds from the holding device.

3. A method as in claim 1, further comprising drying the birds after the spraying of the birds is completed.

4. A method as in claim 1, wherein the step of heating the waterproofing composition is performed by heater units positioned in proximity to the container.

5. A method as in claim 1, wherein the step of heating and the step of spraying are controlled by a control unit that keeps the waterproofing composition in the selected temperature range and controls the amount of time and the pressure at which the spray nozzles spray the birds.

6. A method as in claim 1, wherein the desired temperature range is between about 120° F. and about 175° F.

7. A method as in claim 1, wherein the desired temperature range is between about 120° F. and about 140° F.

8. A method as in claim 1, wherein the game birds are selected from the group consisting of quail, pheasant, chukar, partridge, and grouse.

9. A method as in claim 1, wherein the game birds are quail, and wherein the waterproofing composition is applied the quail from about 0.02 ounces to about 0.10 ounces.

10. A method as in claim 1, wherein the game birds are sprayed with the waterproofing composition for less than a second.

11. A method as in claim 1, wherein the waterproofing composition comprises a paraffin oil and a paraffin wax mixture.

12. A method as in claim 1, wherein the waterproofing composition comprises between about 10% to about 90% of the paraffin oil and between about 10% to about 90% paraffin wax.

13. A method as in claim 1, wherein the waterproofing composition comprises about 60% paraffin oil and about 40% paraffin wax.

14. A method as in claim 1, wherein the waterproofing composition does not have a noticeable odor.

15. A method of waterproofing live game birds having feathers, the method comprising the steps of:
   spraying the game birds with an oil and wax mixture in amounts that prevent excessive water absorption by the feathers of the birds in wet weather, while still permitting the game birds to fly, wherein the game birds are sprayed from a top position and a bottom position, and wherein the oil and wax mixture comprises a paraffin oil and a paraffin wax mixture wherein the birds are sprayed on a dorsal and ventral portion of body; and
   allowing the birds to dry after spraying.

16. A method as in claim 15, further comprising a step of heating the oil and wax mixture to a desired temperature range before said step of spraying.

17. A method as in claim 15, wherein the oil and wax mixture comprises between about 10% to about 90% of the paraffin oil and between about 10% to about 90% paraffin wax.

18. A method as in claim 15, wherein said paraffin oil and paraffin wax mixture comprises about 60% paraffin oil and about 40% paraffin wax.

19. A method as in claim 16, wherein the desired temperature range is between about 120° F. and about 175° F.

20. A method as in claim 16, wherein the desired temperature range is between about 120° F. and about 140° F.

21. A method as in claim 15, wherein the game birds are selected from the group consisting of quail, pheasant, chukar, partridge, and grouse.

22. A method as in claim 15, wherein the game birds are quail, and wherein the oil and wax mixture is applied the quail from about 0.02 ounces to about 0.1 ounces.

23. A method as in claim 15, wherein the game birds are sprayed with the oil and wax mixture for less than a second.

24. A method as in claim 15, wherein the oil and wax mixture does not have a noticeable odor.

* * * * *